(12) United States Patent
Liang et al.

(10) Patent No.: US 11,307,782 B2
(45) Date of Patent: Apr. 19, 2022

(54) HOST IDENTIFICATION AND VERIFICATION SYSTEM AND METHOD FOR A MEMORY SYSTEM

(71) Applicant: Micron Technology, Inc., Boise, ID (US)

(72) Inventors: Qing Liang, Boise, ID (US); Jun Huang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 16/891,650

(22) Filed: Jun. 3, 2020

(65) Prior Publication Data
US 2021/0382639 A1 Dec. 9, 2021

(51) Int. Cl.
*G06F 3/06* (2006.01)
*H04L 9/32* (2006.01)

(52) U.S. Cl.
CPC .......... *G06F 3/0632* (2013.01); *G06F 3/0604* (2013.01); *G06F 3/0622* (2013.01); *G06F 3/0679* (2013.01); *H04L 9/3213* (2013.01)

(58) Field of Classification Search
None
See application file for complete search history.

(56) References Cited

U.S. PATENT DOCUMENTS

2015/0301754 A1* 10/2015 Kochar ................ G06F 3/0616
                                                                711/103
2020/0242038 A1* 7/2020 Bazarsky ............. G06F 3/0629
2021/0034553 A1* 2/2021 Byron ................. G06F 13/1668

* cited by examiner

*Primary Examiner* — Jane Wei
(74) *Attorney, Agent, or Firm* — Holland & Hart LLP

(57) ABSTRACT

Methods, systems, and devices related to host identification for a memory system are described. A memory system may receive an index value from a host system that is associated with an identification of the host system. The memory system may identify one or more operating parameter associated with the index value based on receiving the index value. The memory system controller may configure the memory system to utilize one or more operating parameters associated with the index value based on identifying the operating parameters. The memory system may output an indication to the host system that the operating parameters associated with the index value are configured to be utilized by the memory system.

25 Claims, 5 Drawing Sheets

HOST IDENTIFICATION AND VERIFICATION SYSTEM AND METHOD FOR A MEMORY SYSTEM

BACKGROUND

The following relates generally to one or more memory systems and more specifically to host identification for a memory system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not- or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A host system may perform a variety of operations, applications, and processing tasks. To perform these functions, a host system may request customized features from a memory system coupled to the host system. Some host systems may request for additional customized features from the memory systems over time. The memory system may achieve the customized features by revising the firmware installed on the memory system. The memory system may also utilize different trim settings and different uses for an application-specific integrated circuit (ASIC) to achieve the customized features. Additionally, to achieve the customized features in the memory systems, resources may be used to develop and support configuring the customized features. Developing and supporting these customized features may reduce an ability to manufacture common memory systems to meet market demands. For example, customizing the memory system may be delayed until a host system's requests are known. With various host system requests, manufacturing times and resources utilized may increase, reducing the ability to meet market demands.

Systems, devices, and techniques are described for providing a memory system with a plurality of operating parameters using a generic firmware solution that includes different activatable and customizable special features. The memory system may receive an indication, such as a host identifier (e.g., host ID), from a host system during an initialization procedure. The host ID may include a request from the host system to the memory system to utilize a specific subset of the customized operating parameters to support the host system's functions. For example, the host ID may request specific trim settings, firmware revisions, and hardware components be utilized by the memory system. Additionally, the memory system may verify the host ID using a verification process. If the memory system can verify the host ID, the memory system may be configured to operate using the requested operating parameters from the host system by triggering various activatable and customizable special features. If the memory system fails to verify the host ID, the memory system may refrain from utilizing any operating parameters. In such cases, the verification process may help ensure that the memory system does not operate for unauthorized hosts. Because the customized operating parameters are a part of a general firmware solution, the manufacturing times of the memory system may be reduced. Such systems, devices, and techniques may increase the ability to manufacture common memory systems and configure those common memory systems for specific uses after manufacturing.

Figure 4:
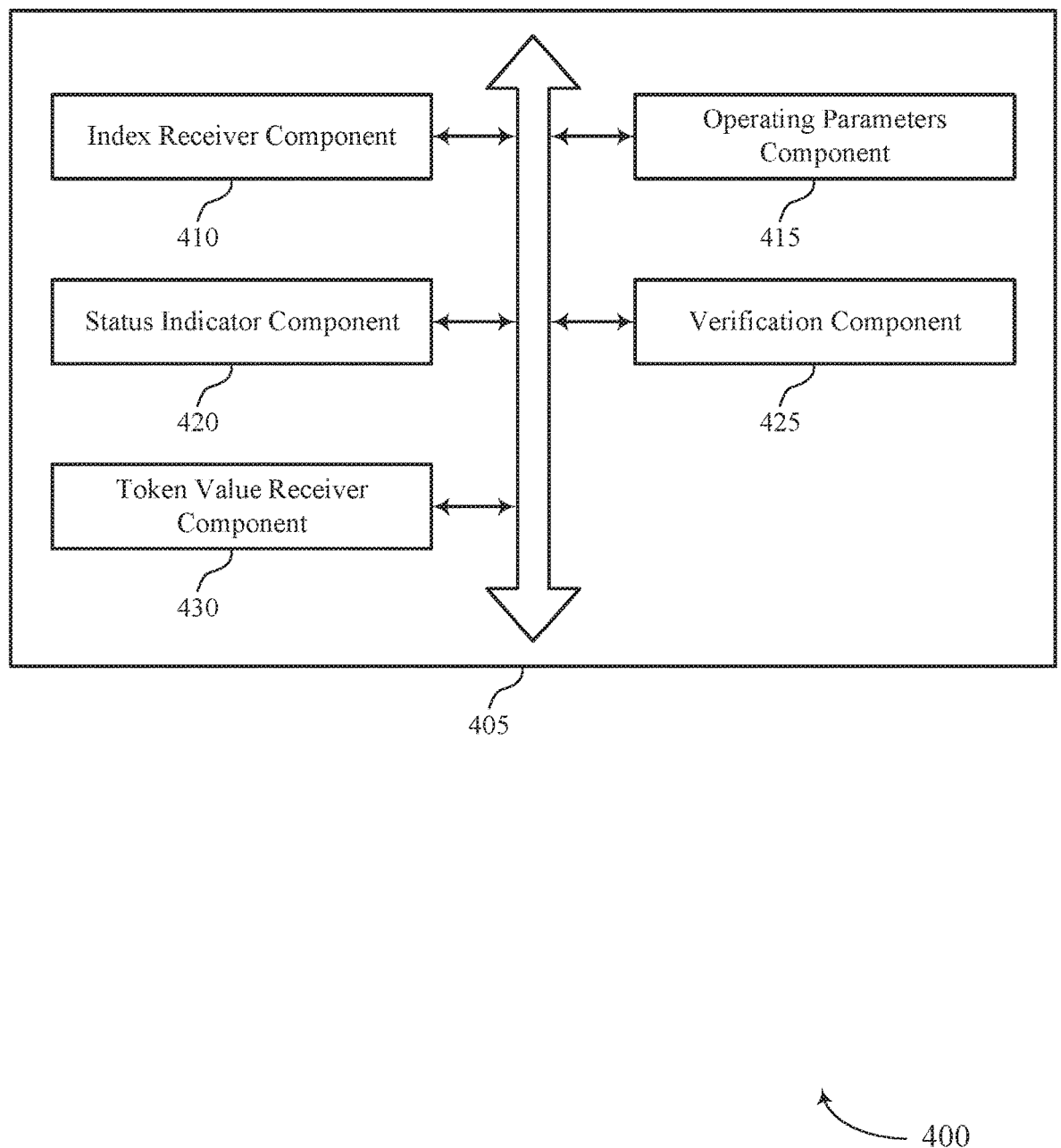
FIG. 4 shows a block diagram of a memory system that supports host identification for a memory system in accordance with aspects of the present disclosure.
Figure 5:
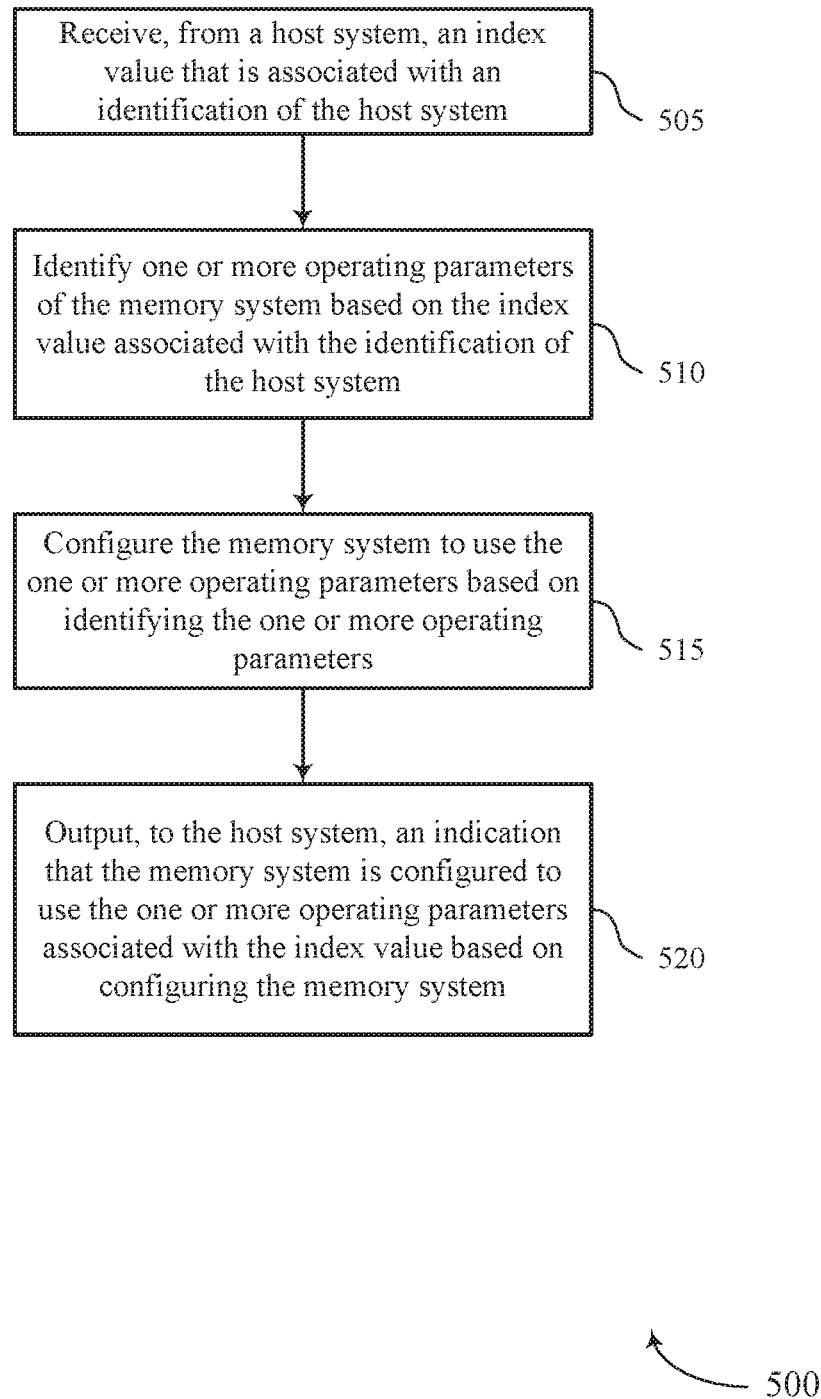
FIG. 5 shows a flowchart illustrating a method or methods that support host identification for a memory system in accordance with examples as disclosed herein.

Features of the disclosure are initially described in the context of systems, devices, and circuits as described with reference to FIG. 1. Features of the disclosure are described in the context of a process flow diagram and a command signal as described with reference to FIGS. 2 and 3. These and other features of the disclosure are further illustrated by and described with reference to an apparatus diagram and a flowchart that relate to host identification in a memory system as described with reference to FIGS. 4 and 5.

Figure 1:
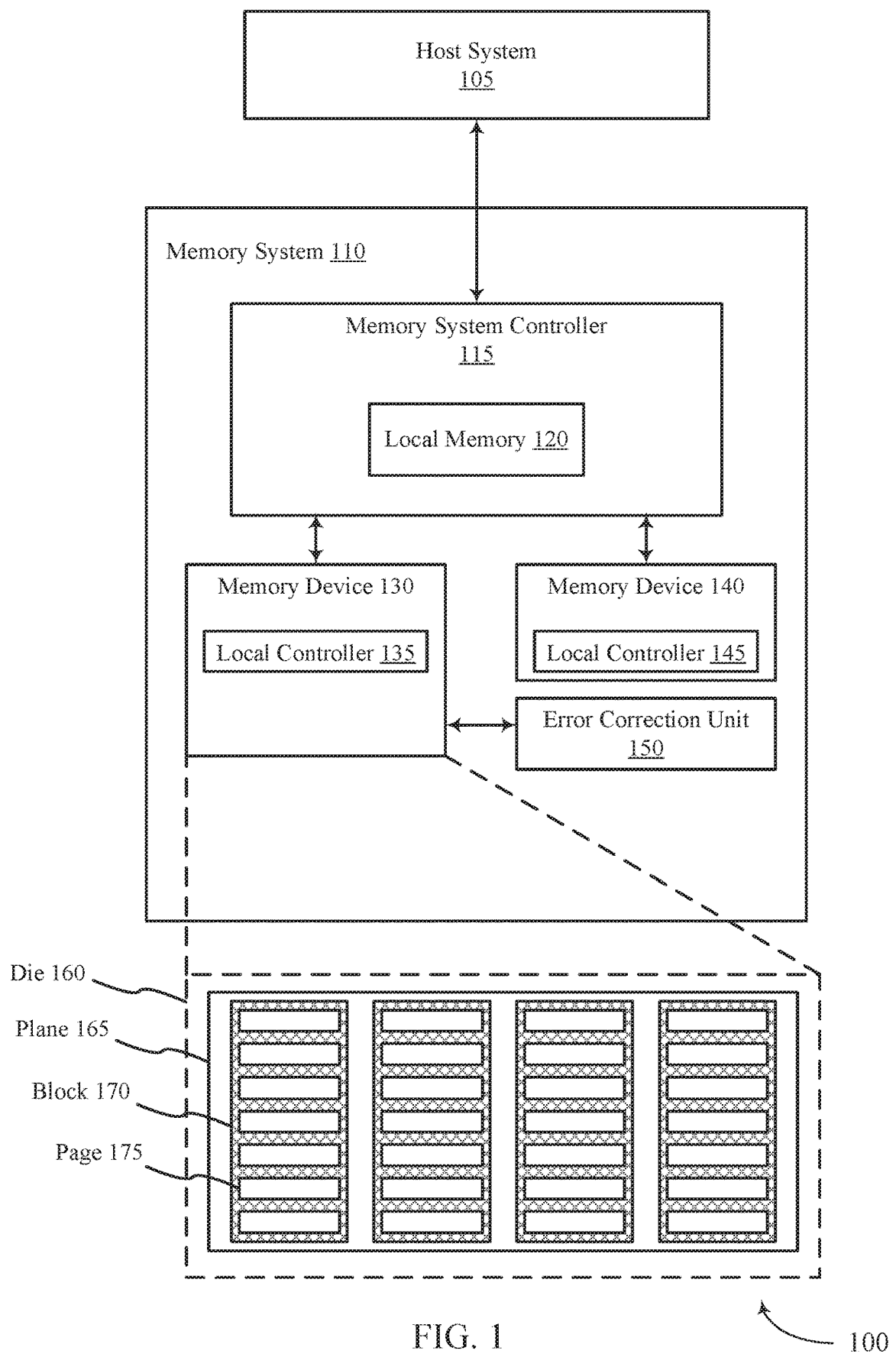
FIG. 1 illustrates an example of a system that supports host identification for a memory system in accordance with examples as disclosed herein.

FIG. 1 is an example of a system 100 that supports host identification in a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Though one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), a double data rate (DDR) memory bus, a DIMM interface (e.g., DIMM socket interface that supports DDR), Open NAND Flash Interface (ONFI), Low Power Double Data Rate (LPDDR). In some cases, the host system 105 may be coupled with the memory system 110 via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Though one memory device 130 and one memory device 140 are shown in the example of FIG. 1, the memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error checking operations or error correcting code (ECC) operations such as error-detecting operations or error-correcting operations, encryption operations, caching operations, media management operations, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an ASIC, a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may not be updated without the entire block 170 that includes the page 175 being erased.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased. In some examples, the memory system controller 115 may mark the region within the LBA of page 175 that stores the invalid data. In some examples, the L2P tables may be updated as well to show where the invalid data is stored.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for some or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105). In some examples, memory device 130 may facilitate the garbage collection operation. A command or instruction may indicate which portions of page 175 stores invalid data. In such cases, the garbage collection may be performed more efficiently as the pages 175 that hold invalid data are identified via the trim settings.

The memory device 130 may be in communication with an error control unit 150 (ECU). The ECU 150 may perform operations such as error detection operations, error correction operations, error correcting code operations, or a combination thereof. The local controller 135 may send information to and receive information from the ECU 150.

In some examples the host system 105 may request specific customized operating parameters be utilized by the memory system 110. Over time, the host system 105 may send additional requests for new customized operating parameters. For example, the host system 105 may request the memory device 130 have specific trim settings or firmware revisions. The memory system 110 may be configured to implement the requested customized operating parameters during a manufacturing process. In some examples, additional resources may be utilized manufacture the memory system 110 with the requested customized operating parameters (e.g., the specific trim settings requested by the host system 105). In such cases, the use of additional resources may reduce an ability to manufacture common memory systems to meet market demands.

Here, memory system 110 may include a plurality of customized operating parameters using a generic firmware solution. The memory system 110 may be configurable in a plurality of configurations based on using the generic firmware solution. That is, the plurality of operating parameters in the memory system 110 may include multiple sets of operating parameters, where each set of operating parameters may correspond to a unique request (e.g., index value) by the host system 105. In some examples, by having the plurality of operating parameters, the memory system 110 may be able to have a configuration that is customizable based on the index value received from the host system 105—e.g., selecting a specific set of operating parameters from the plurality of operating parameters for a host system 105 based on receiving an index value from the host system 105. For example, the host system 105 may send an index value that is associated with a first set of operating parameters from the plurality of operating parameters. The memory system 110 may receive and verify the index value. If the index value is verified, the memory system controller 115 may cause the memory system 110 to be configured with the operating parameters associated with the index value. That is, the memory system 115 may identify which set of operating parameters of the generic firmware solution correspond to the index value and configure the memory system 110 to utilize them. By implementing a generic firmware solution, the ability to manufacture common memory systems may be increased.

The system 100 may include any quantity of non-transitory computer readable media that support host identification for a memory system. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

Figure 2:
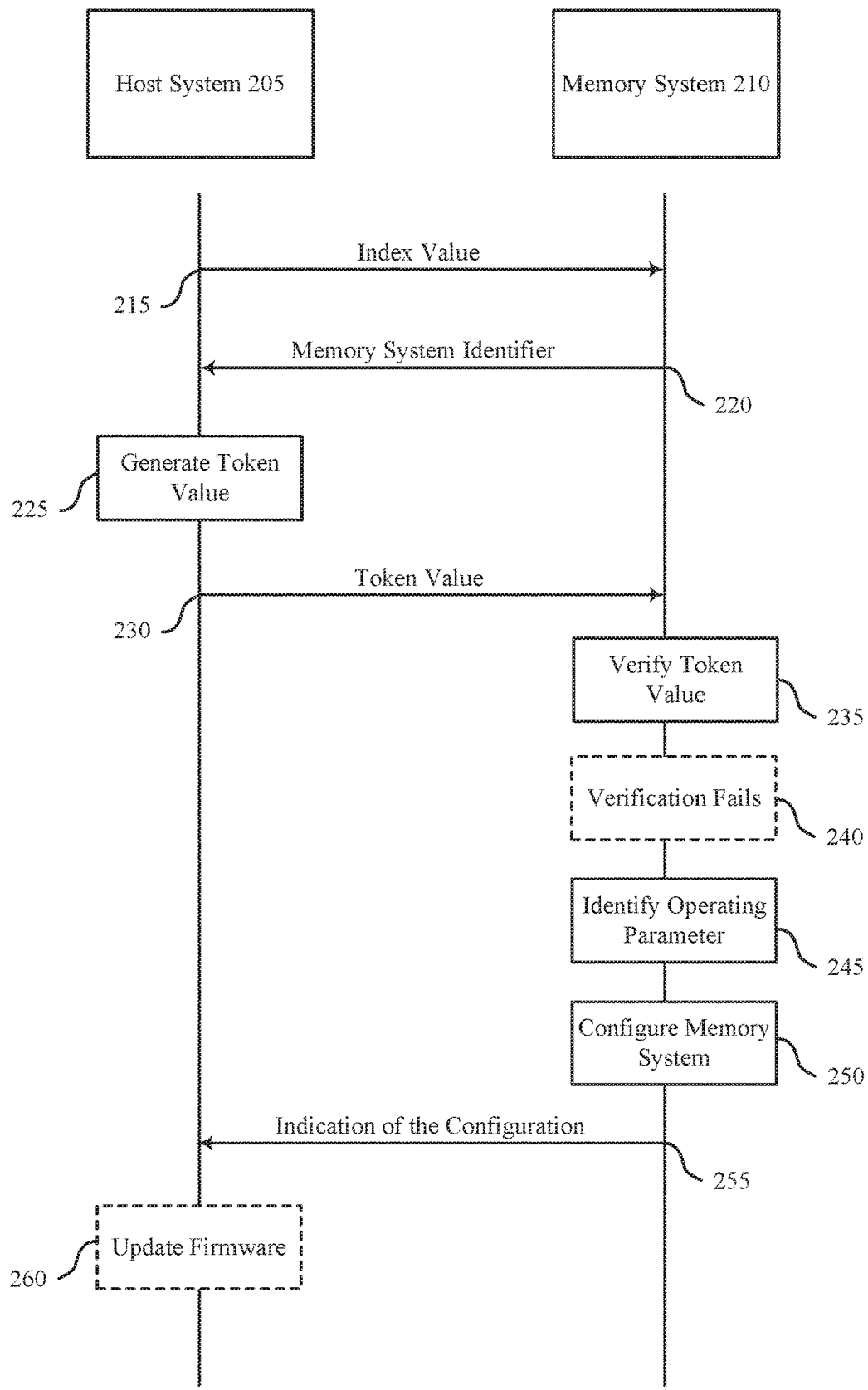
FIG. 2 illustrates an example of a process flow diagram that illustrates methods that support host identification for a memory system in accordance with examples as disclosed herein.

FIG. 2 illustrates a process flow diagram that supports host identification for a memory system in accordance with examples as disclosed herein. The method 200 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the method 200 may be performed by system (e.g., system 100) as described with reference to FIG. 1. For example, the method 200 may be performed by a host system 205 (e.g., host system 105 as described with reference to FIG. 1) and a memory system 210 (e.g., memory system 110 as described with reference to FIG. 2). In some examples, a memory system may execute a set of codes to control the functional elements of the memory device to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

The host system 205 may perform a variety of functions (e.g., initiating operations, initiating applications, processing data, and sending commands). The host system 205 may request the memory system 210 utilize customized operating parameters to perform the functions. Over time, as the host system 205 performs more intricate functions, the host system 205 may request for additional customized operating parameters from the memory system 210. In some examples, the host system 205 may request specific trim settings, firmware revisions, and hardware components to perform various functions. For example, if memory system 210 includes NAND memory cells (e.g., memory device 130 as described with reference to FIG. 1), the host system 205 may request a specific trim setting to facilitate a garbage collection operation. In other examples, one host system 205 may request the memory system 210 provide the quantity of times a program-erase (P/E) cycle has been performed while another host system 205 may request the P/E cycle information and the volume of data read from the memory system 210. The memory system 210 may be manufactured with the specific trim settings, firmware revisions, and hardware component uses to achieve the customized operating parameters requested by the host system 205. In some examples, additional resources may be used to manufacture memory system 210 to achieve the customized operating parameters.

For example, the memory system 210 may wait to be configured until requests from the host system 205 are received. That is, the manufacturing process may be delayed and experience high volumes at the times the host system's 205 requests are received. In other examples, when manufacturing the memory system 210, each customized operating parameter may utilize a separate sub-product and cause additional resources to be used. Customizing the memory system 210 after at least some manufacturing processes are complete or nearly complete may reduce an ability to manufacture common memory systems to meet market demands.

As disclosed herein, the memory system 210 may include a plurality of customized operating parameters using a generic firmware solution that includes different activatable operating parameters based on requests sent by the host system 205. That is, memory system 210 may have a generic firmware solution that includes a plurality of configuration possibilities, each configuration having several different trim settings, firmware revisions, and hardware component uses a host system 205 may utilize. As memory system 210 is configured to utilize the customized operating parameters after the manufacturing process, the systems, devices, and techniques disclosed herein may reduce resources utilized in the manufacturing process. Method 200 may be one example of the memory system 210 being configured to use specific customized operating parameters based on a request sent by the host system 205.

At 215, an index value (e.g., host identifier) may be received. For example, the memory system 210 receives the index value from the host system 205. The index value may be received at a memory system controller (e.g., memory system controller 115 as described with reference to FIG. 1). In some examples, the index value may be received when the memory system is first turned on (e.g., powers up) during an initialization procedure. In such cases, the host system 205 may refrain from sending the index value at a time after the initialization procedure. In some cases, the index value may be unique to each host system 205 (e.g., a host ID). In other examples, the memory system 210 may determine what type of device the host system 205 is utilized in (e.g., laptop computer, network server, mobile device, a vehicle) based on the index value received. Additionally or alternatively, the index value may be associated with specific operating parameters requested by the host system 205. That is, the host system 205 may indicate the operating parameters the memory system 210 be configured to use by sending the index value. As described herein and with reference to FIG. 3, the index value may be received in the same message that is typically used to communicate between the memory system 210 and the host system 205.

At 220, a memory system identifier may be sent. For example, the host system 205 may receive the memory system identifier from the memory system 210. The memory system identifier may be sent by the memory system controller 215. In some examples, after receiving the index value from the host system 205, the memory system 210 may verify the index value. That is, as the memory system 210 includes a generic firmware solution, there may be an increased chance of a fake host system (e.g., a wrong host system) attempting to ascertain the operating parameters of the memory system 210. Additionally or alternatively, with the generic firmware solution, the memory system 210 may also increase the chance of utilizing operating parameters that fail to satisfy the host system's 205 requests. In some examples, the memory system may implement a verification process to reduce the risk of utilizing the incorrect operating parameters or revealing the operating parameters to a fake host system. As part of the verification process, the host system 205 may request and fetch the memory system identifier. The memory system identifier may be unique to the memory system 210. That is, each memory system 210 may be assigned a unique memory system identifier in the manufacturing process. The memory system identifier may also be referred to as a serial quantity for the memory system 210.

At 225, a token value may be generated. For example, the host system 205 may generate the token value based on receiving the memory system identifier from the memory system 220. In some examples, the host system 205 may generate the token value by encrypting (e.g., signing) the memory system identifier with a security key associated with the host system 205. In some examples, a unique security key (e.g., a private key) may be assigned to each customer or user of the memory system. That is, each host system 205 belonging to a specific customer may be given the same security key so long as each customer is assigned a different security key. In other examples, each host system 205 may be assigned a unique security key by the manufacturer of the memory system or an affiliated system. In either example (e.g., the security key is assigned to each specific customer or each specific host system 205), the memory system 210 may reduce the chance of sending information to a fake host. That is, a fake host may be unable to generate a token value as the fake host would lack the unique security key.

At 230, a token value may be received. For example, the memory system 210 receives the token value from the host system 205. The token value may be received at the memory system controller. In some examples, the host system 205 may send the token value to the memory system 210 based on generating the token value as part of the verification process.

At 235, the token value may be verified. For example, the memory system 210 verifies the token value received from the host system 205. The token value may be verified at the memory system controller. In some examples, the memory system controller may verify the token value by comparing the token value with a stored manufacturer key (e.g., a second value). That is, each memory system 210 may store a manufacturer key and determine if the token value is verified by comparing the token value received from the host system 205 with the stored manufacturer key. In some examples, the manufacturer key may be associated with the possible combinations of the memory system identifier being encrypted with a security key. For example, if the manufacturer had three customers each assigned with a different security key, the manufacturer key may represent the three possibilities a generated token value may take. In some cases, the memory system 110 may update the manufacturer key based on new security keys being assigned or deactivated. In some examples, if the memory system 210 determines that the token value satisfies the manufacturer key, the memory system may also determine the index value is verified. That is, verifying the index value may be based on verifying the token value.

At 240, the token value may fail the verification process. For example, the memory system 210 may determine the token value received from the host system 205 fails to satisfy the verification process. In some examples, the memory system controller may determine that the token value fails to satisfy the manufacturer key. For example, a fake host may be unable to generate a satisfactory token value as the fake host may fail to have an assigned security key. If the memory system controller compares the token value with the stored manufacture key and determines the verification has failed, the memory system 210 may refrain from utilizing any operating parameters. In some cases, the memory system 210 may power off (e.g., shut down) and refrain from communicating with the host system 205. In some cases, the memory system 210 may refrain from fully initializing and provide a reduced functionality to the host system 205 (such as no functionality, in some examples).

At 245, the operating parameters may be identified. For example, the memory system 210 identifies which operating parameters to utilize based on verifying the index value. The identification of the operating parameters may take place at the memory system controller. As described herein and above, in some examples the memory system 210 may include a generic firmware solution. In such cases, the memory system 210 may include a plurality of operating parameters. After the verification of the index value, the memory system controller may identify a set of operating parameters associated with the index value from the plurality of operating parameters. That is, the plurality of operating parameters included in the memory system 210 may include multiple sets of operating parameters, each set of operating parameters corresponding to a respective index value of a plurality of index values. For example, the memory system 210 may be configurable in various combinations and each combination may be associated with a potential index value the memory system 210 may receive. In this example, the index value may indicate which specific set of operating parameters, from the plurality of operating parameters, the host system 205 requests from the memory system 210. Based on the indication, the memory system 210 may identify the specific set of operating parameters from the plurality of operating parameters. In some examples, the verification of the index value may preclude the memory system 210 from identifying incorrect operating parameters. In some cases, the token value may be associated with a customer and the index value may be associated with the specific operating parameters the memory system 210 is to implement.

At 250, the operating parameters may be configured. For example, the memory system controller may configure the memory system 210 to utilize the set of operating parameters. In some examples, the configuration may be based on identifying the set of operating parameters. In such cases, the memory system 210 may be configured to utilize the set of operating parameters requested by the host system via the index value. For example, the memory system 210 may be configured to utilize specific firmware revisions, trim settings, and ASIC uses based on the index value received. In some examples, the memory system 210 may be configured to send the quantity of times a P/E cycle has been performed and the volume of data read from the memory system 210 to the host system 205 based on the configuration to utilize the operating parameters requested by the host system 205.

At 255, an indication of the configuration may be sent. For example, the host system 205 receives the indication of the configuration being complete. The indication may be sent from the memory system controller. The host system 205 may determine the memory system 210 is correctly configured and available to use based on the receiving the indication of the configuration.

At 260, updates to the firmware may be checked for. For example, the host system 205 may check for firmware updates. In some examples, the host system 205 may request for a new customized operating parameter (e.g., a set of operating parameters) that the memory system 210 fails to satisfy. In such cases, the host system 205 may initiate an update to the firmware of the memory system 210. In some cases, the host system 205 receives the information associated with the firmware update from the manufacturer. In some examples, the host system 205 may send a second index value (e.g., the firmware update information) to the memory system 210 after receiving the information from the manufacturer. The memory system 210 may be reconfigured after the update to utilize the new customized operating parameter based on receiving the second index value. That is, the memory system 210 may identify a new set of operating parameters from the plurality of operating parameters in the updated firmware and be configured to utilize the new set of operating parameters. The memory system 210 may also send a second indication to the host system 205 to indicate the memory system 210 is configured to utilize the new set of operating parameters.

Figure 3:
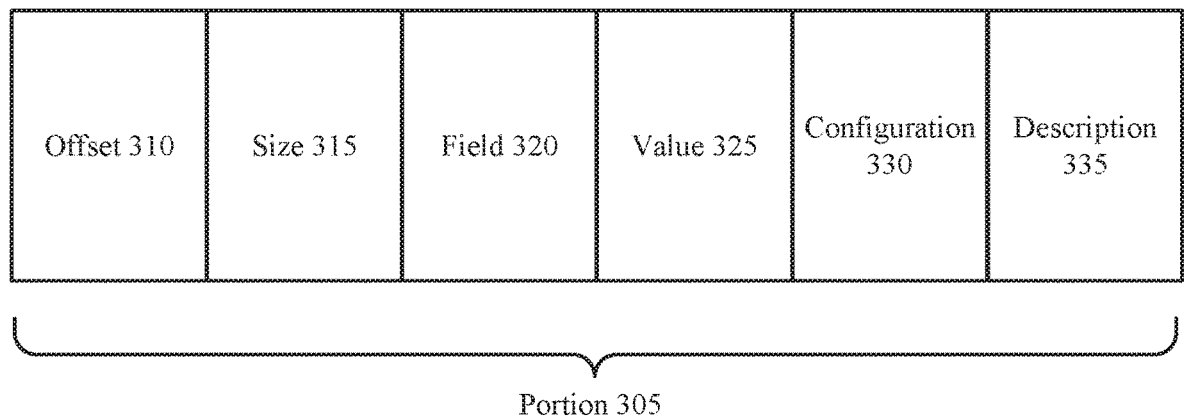
FIG. 3 illustrates an example of a command signal that supports host identification for a memory system in accordance with examples as disclosed herein.

FIG. 3 illustrates a command signal 300 that supports host identification for a memory system in accordance with examples as disclosed herein. In some examples, the command signal 300 may be performed by a system as described with reference to FIGS. 1 and 2. For example, the command signal 300 may be sent from a host system (e.g. the host system 105 as described with reference to FIG. 1) to a memory system (e.g., the memory system 110 as described with reference to FIG. 1). In some examples, the memory system may include a UFS interface. In some cases, command signal 300 may be an example of a command sent by the host system as described with reference to FIG. 1 (e.g., commands for access operations, wear leveling operations, ECC operations, initialization operations, etc.)

In some examples, the host system may communicate with the memory system via commands signals 300. The command signal 300 may include a plurality of portions 305. Each portion 305 of the command signal 300 may include offset 310, size 315, field 320, value 325, configuration 330, and description 335. The offset 310 may be configured to indicate the distance from a known memory address. For example, the offset 310 may indicate that a specific portion 305 in the command signal 300 is a specific distance in bytes (e.g. 40) away from a first portion sent (e.g., an offset 310 of zero). The size 315 may be configured to indicate the data size of a specified portion 305 in the command signal 300. For example, a size 315 of eight may indicate a portion 305 within the command signal 300 includes eight bits of data. Field 320 may be configured to indicate the name of a specified portion 305 in the command signal 300. The value 325 may be configured to indicate what type of field 320 is being communicated in a specified portion 305. For example, the value 325 may indicate whether a field 320 is a quantity, an integer, an ID, and index, a protocol, etc. Configuration 330 may be configured to indicate whether a specific portion 305 is associated with a configuration setting for a memory system. Description 335 may be configured to identify the purpose of a specified portion 305 in the command signal 300.

In some examples, the command signal 300 may be received by the memory system with reserved portions 305. That is, some portions 305 in the command signal 300 may include empty (e.g. unused) bits that do not communicate information. In such cases, an index value (e.g., the index value at 215 as described with reference to FIG. 2) may be sent in a portion 305 of the command signal 300 that is otherwise reserved (e.g., unused). That is, the index value may be sent in a portion 305 that is typically reserved and has empty bits in the command signal 300. For example, the index value may be sent in a portion 305 having an offset 310 of 40h, a size 315 of eight, a field 320 marked gHostID, a value 325 of 00h, that indicates a configuration setting in the configuration 330 space that is otherwise reserved in a first command signal 300. In some examples, the memory system may receive a second command signal 300 that includes a reserved portion 305 in the same location the portion 305 that was used to send the index value in the first command signal. That is, the second command signal 300 may have a portion 305 that is reserved located at 40h offset 310.

For example, the first command signal 300 may include six portions 305, two of which are reserved and one of which includes the index value. In such cases, the second command signal 300 may also include six portions 305, three of which are reserved including the portion 305 that held the index value information in the first command signal 300. That is, the memory system may receive the index value in a command signal 300 that has the same size as ordinary commands sent by the host system do.

As described herein and with reference to FIG. 2, a memory system may include a generic firmware solution with a plurality of operating parameters. Utilizing a reserved portion 305 when sending the index value may facilitate the memory system to identify a set of operating parameters requested by the host system. That is, the index value sent in portion 305 may indicate which operating parameters the host system is requesting. Additionally, utilizing the reserved portion 305 to send the index value may increase the ability to manufacture common memory systems to meet market demands as the configuration may take place after the manufacturing process when the index value is received at the memory system.

FIG. 1 shows a block diagram 100 of a memory system 105 that supports host identification for a memory system in accordance with examples as disclosed herein. The memory system 105 may be an example of aspects of a memory system as described with reference to FIGS. 1-3. The memory system 105 may include an index receiver component 110, an operating parameters component 115, a status indicator component 120, a verification component 125, and a token value receiver component 130. Each of these modules may communicate, directly or indirectly, with one another (e.g., via one or more buses).

The index receiver component 110 may receive, from a host system, an index value that is associated with an identification of the host system. In some examples, the index receiver component 110 may receive, from the host system, a first command signal having a quantity of bits and including the index value indicated in a portion of the first command signal. In some cases, receiving, from the host system, a second command signal including the quantity of bits, where the portion of the second command signal includes one or more reserved bits. In some instances, the index receiver component 110 may receive, from the host system, a second index value that is associated with a set of operating parameters different than the one or more operating parameters. In some cases, the index value is received by the memory system as part of an initialization procedure.

The operating parameters component 115 may identify one or more operating parameters of the memory system based on the index value associated with the identification of the host system. In some examples, the operating parameters component 115 may configure the memory system to use the one or more operating parameters based on identifying the one or more operating parameters. In some cases, the operating parameters component 115 may refrain from configuring the memory system to use the one or more operating parameters based on determining the token value is different than the second value. In some instances, the operating parameters component 115 may identify from a set of operating parameters stored by the memory system the one or more operating parameters associated with the index value, where configuring the memory system is based on the identifying. In some examples, the operating parameters component 115 may configure the memory system to use the set of operating parameters based on receiving the second index value. In some cases, the one or more operating parameters of the operating parameters component 115 may include trim parameters of the memory system.

The status indicator component 120 may output, to the host system, an indication that the memory system is configured to use the one or more operating parameters associated with the index value based on configuring the memory system. In some instances, the status indicator component 120 may output, to the host system, an indication that the memory system is configured to use the set of operating parameters based on configuring the memory system.

The verification component 125 may verify, at the memory system, the index value with a value stored by the memory system that is associated with the one or more operating parameters, where configuring the memory system is based on verifying the index value with the value. In some examples, the verification component 125 may determine that the token value matches a second value stored by the memory system and that is associated with the one or more operating parameters, where verifying the index value is based on determining that the token value matches the second value. In some cases, the verification component 125 may output, to the host system, a memory system identifier. In some instances, the verification component 125 may determine that the token value is different than a second value stored by the memory system and that is associated with the one or more operating parameters. In some examples, the verification component 125 may compare the token value with a second value stored by the memory system and that is associated with the one or more operating parameters, where verifying the index value is based on comparing the token value with the second value.

The token value receiver component 130 may receive, from the host system, a token value that is associated with the index value. In some cases, the token value receiver component 130 may receive, from the host system, a token value that is generated based on the memory system identifier and a security key associated with the host system, where verifying the index value is based on receiving the token value.

FIG. 2 shows a flowchart illustrating a method or methods 200 that supports host identification for a memory system in accordance with aspects of the present disclosure. The operations of method 200 may be implemented by a memory system or its components as described herein. For example, the operations of method 200 may be performed by a memory system as described with reference to FIG. 1. In some examples, a memory system may execute a set of instructions to control the functional elements of the memory system to perform the described functions. Additionally or alternatively, a memory system may perform aspects of the described functions using special-purpose hardware.

At 205, the memory system may receive, from a host system, an index value that is associated with an identification of the host system. The operations of 205 may be performed according to the methods described herein. In some examples, aspects of the operations of 205 may be performed by an index receiver component as described with reference to FIG. 1.

At 210, the memory system may identify one or more operating parameters of the memory system based on the index value associated with the identification of the host system. The operations of 210 may be performed according to the methods described herein. In some examples, aspects of the operations of 210 may be performed by an operating parameters component as described with reference to FIG. 1.

At 215, the memory system may configure the memory system to use the one or more operating parameters based on identifying the one or more operating parameters. The operations of 215 may be performed according to the methods described herein. In some examples, aspects of the operations of 215 may be performed by an operating parameters component as described with reference to FIG. 1.

At 220, the memory system may output, to the host system, an indication that the memory system is configured to use the one or more operating parameters associated with the index value based on configuring the memory system. The operations of 220 may be performed according to the methods described herein. In some examples, aspects of the operations of 220 may be performed by a status indicator component as described with reference to FIG. 1.

In some examples, an apparatus as described herein may perform a method or methods, such as the method 200. The apparatus may include features, means, or instructions (e.g., a non-transitory computer-readable medium storing instructions executable by a processor) for receiving, from a host system, an index value that is associated with an identification of the host system, identifying one or more operating parameters of the memory system based on the index value associated with the identification of the host system, configuring the memory system to use the one or more operating parameters based on identifying the one or more operating parameters, and outputting, to the host system, an indication that the memory system is configured to use the one or more operating parameters associated with the index value based on configuring the memory system.

Some cases of the method 200 and the apparatus described herein may further include operations, features, means, or instructions for verifying, at the memory system, the index value with a value stored by the memory system that may be associated with the one or more operating parameters, where configuring the memory system may be based on verifying the index value with the value.

Some instances of the method 200 and the apparatus described herein may further include operations, features, means, or instructions for receiving, from the host system, a token value that may be associated with the index value, and determining that the token value matches a second value stored by the memory system and that may be associated with the one or more operating parameters, where verifying the index value may be based on determining that the token value matches the second value.

Some examples of the method 200 and the apparatus described herein may further include operations, features, means, or instructions for outputting, to the host system, a memory system identifier, and receiving, from the host system, a token value that may be generated based on the memory system identifier and a security key associated with the host system, where verifying the index value may be based on receiving the token value.

Some cases of the method 200 and the apparatus described herein may further include operations, features, means, or instructions for determining that the token value may be different than a second value stored by the memory system and that may be associated with the one or more operating parameters, and refraining from configuring the memory system to use the one or more operating parameters based on determining the token value may be different than the second value.

Some instances of the method 200 and the apparatus described herein may further include operations, features, means, or instructions for comparing the token value with a second value stored by the memory system and that may be associated with the one or more operating parameters, where verifying the index value may be based on comparing the token value with the second value.

In some examples of the method 200 and the apparatus described herein, receiving the index value further may include operations, features, means, or instructions for receiving, from the host system, a first command signal having a quantity of bits and including the index value indicated in a portion of the first command signal.

Some cases of the method 200 and the apparatus described herein may further include operations, features, means, or instructions for receiving, from the host system, a second command signal including the quantity of bits, where the portion of the second command signal includes one or more reserved bits.

Some instances of the method 200 and the apparatus described herein may further include operations, features, means, or instructions for identifying from a set of operating parameters stored by the memory system the one or more operating parameters associated with the index value, where configuring the memory system may be based on the identifying.

Some examples of the method 200 and the apparatus described herein may further include operations, features, means, or instructions for receiving, from the host system, a second index value that may be associated with a set of operating parameters different than the one or more operating parameters, configuring the memory system to use the set of operating parameters based on receiving the second index value, and outputting, to the host system, an indication that the memory system may be configured to use the set of operating parameters based on configuring the memory system.

In some cases of the method 200 and the apparatus described herein, the one or more operating parameters of the memory system include trim parameters of the memory system.

In some instances of the method 200 and the apparatus described herein, the index value may be received by the memory system as part of an initialization procedure.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory system, a control component associated with the memory system and configured to cause the apparatus to, identify one or more operating parameters of the memory system based on the index value associated with the identification of the host system, configure the memory system to use the one or more operating parameters based on identifying the one or more operating parameters, and output, to the host system, an indication that the memory system is configured to use the one or more operating parameters associated with the index value based on configuring the memory system.

In some cases, the controller may be further configured to verify, at the memory system, the index value with a value stored by the memory system that may be associated with the one or more operating parameters, where configuring the memory system may be based on verifying the index value with the value.

In some instances, the controller may be further configured to receive, from the host system, a token value that may be associated with the index value, and determine that the token value matches a second value stored by the memory system and that may be associated with the one or more operating parameters, where verifying the index value may be based on determining that the token value matches the second value.

In some examples, the controller may be further configured to output, to the host system, a memory system identifier, and receive, from the host system, a token value that may be generate based on the memory system identifier and a security key associated with the host system, where verifying the index value may be based on receiving the token value.

In some cases, the controller may be further configured to determine that the token value may be different than a second value stored by the memory system and that may be associated with the one or more operating parameters, and refrain from configuring the memory system to use the one or more operating parameters based on determining the token value may be different than the second value.

In some instances, the controller may be further configured to compare the token value with a second value stored by the memory system and that may be associated with the one or more operating parameters, where verifying the index value may be based on comparing the token value with the second value.

In some examples, the controller may be further configured to receive, from the host system, a first command signal having a quantity of bits and including the index value indicated in a portion of the first command signal. In some cases, the controller may be further configured to receive, from the host system, a second command signal including the quantity of bits, where the portion of the second command signal includes one or more reserved bits. In some instances, the controller may be further configured to identify from a set of operating parameters stored by the memory system the one or more operating parameters associated with the index value, where configuring the memory system may be based on the identifying.

In some examples, the controller may be further configured to receive, from the host system, a second index value that may be associated with a set of operating parameters different than the one or more operating parameters, configure the memory system to use the set of operating parameters based on receiving the second index value, and output, to the host system, a second indication that the memory system may be configured to use the set of operating parameters based on configuring the memory system.

In some cases, the memory system includes a set of NAND memory cells. In some instances, the one or more operating parameters of the memory system include trim parameters of the memory system. Some examples may further include receiving the index value as part of an initialization procedure Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising;
a memory system;
a memory system controller associated with the memory system and configured to cause the apparatus to:
receive, from a host system, an index value that is associated with an identification of the host system;

identify one or more operating parameters of the memory system based at least in part on the index value associated with the identification of the host system;

configure the memory system to use the one or more operating parameters based at least in part on identifying the one or more operating parameters;

verify, at the memory system, the index value with a value stored by the memory system that is associated with the one or more operating parameters, wherein configuring the memory system is based at least in part on verifying the index value with the value; and output, to the host system, an indication that the memory system is configured to use the one or more operating parameters associated with the index value based at least in part on configuring the memory system.

2. The apparatus of claim 1, wherein the memory system controller is further configured to cause the apparatus to:

receive, from the host system, a token value that is associated with the index value; and determine that the token value matches a second value stored by the memory system and that is associated with the one or more operating parameters, wherein verifying the index value is based at least in part on determining that the token value matches the second value.

3. The apparatus of claim 1, wherein the memory system controller is further configured to cause the apparatus to:

output, to the host system, a memory system identifier; and receive, from the host system, a token value that is generated based at least in part on the memory system identifier and a security key associated with the host system, wherein verifying the index value is based at least in part on receiving the token value.

4. The apparatus of claim 3, wherein the memory system controller is further configured to cause the apparatus to:

determine that the token value is different than a second value stored by the memory system and that is associated with the one or more operating parameters; and refrain from configuring the memory system to use the one or more operating parameters based at least in part on determining the token value is different than the second value.

5. The apparatus of claim 3, wherein the memory system controller is further configured to cause the apparatus to:

compare the token value with a second value stored by the memory system and that is associated with the one or more operating parameters, wherein verifying the index value is based at least in part on comparing the token value with the second value.

6. The apparatus of claim 1, wherein the memory system controller is further configured to cause the apparatus to:

receive, from the host system, a first command signal having a quantity of bits and comprising the index value indicated in a portion of the first command signal.

7. The apparatus of claim 6, wherein the memory system controller is further configured to cause the apparatus to:

receive, from the host system, a second command signal comprising the quantity of bits, wherein the portion of the second command signal comprises one or more reserved bits.

8. The apparatus of claim 1, wherein the memory system controller is further configured to cause the apparatus to:

identify from a plurality of operating parameters stored by the memory system the one or more operating parameters associated with the index value, wherein configuring the memory system is based at least in part on the identifying.

9. The apparatus of claim 1, wherein the memory system controller is further configured to cause the apparatus to:

receive, from the host system, a second index value that is associated with a set of operating parameters different than the one or more operating parameters;

configure the memory system to use the set of operating parameters based at least in part on receiving the second index value; and output, to the host system, a second indication that the memory system is configured to use the set of operating parameters based at least in part on configuring the memory system.

10. The apparatus of claim 1, wherein the memory system comprises a plurality of NAND memory cells.

11. The apparatus of claim 1, wherein the one or more operating parameters of the memory system comprise trim parameters of the memory system.

12. The apparatus of claim 1, wherein the memory system controller is further configured to cause the apparatus to:

receive the index value as part of an initialization procedure.

13. A non-transitory computer-readable medium storing code comprising instructions, which when executed by a processor of an electronic device, cause the electronic device to:

receive, from a host system, an index value that is associated with an identification of the host system;

identify one or more operating parameters for a memory system based at least in part on the index value associated with the identification of the host system;

configure the memory system to use the one or more operating parameters based at least in part on identifying the one or more operating parameters;

verify, at the memory system, the index value with a value stored by the memory system that is associated with the one or more operating parameters, wherein configuring the memory system is based at least in part on verifying the index value with the value; and output, to the host system, an indication that the memory system is configured to use the one or more operating parameters associated with the index value based at least in part on configuring the memory system.

14. The non-transitory computer-readable medium of claim 13, wherein the instructions, when executed by the processor the electronic device, further cause the electronic device to:

receive, from the host system, a token value that is associated with the index value; and determine that the token value matches a second value stored by the memory system and that is associated with the one or more operating parameters, wherein verifying the index value is based at least in part on determining that the token value matches the second value.

15. The non-transitory computer-readable medium of claim 13, wherein the instructions, when executed by the processor the electronic device, further cause the electronic device to:

output, to the host system, a memory system identifier; and receive, from the host system, a token value that is generated based at least in part on the memory system identifier and a security key associated with the host system, wherein verifying the index value is based at least in part on receiving the token value.

16. The non-transitory computer-readable medium of claim 15, wherein the instructions, when executed by the processor the electronic device, further cause the electronic device to:
    determine that the token value is different than a second value stored by the memory system and that is associated with the one or more operating parameters; and
    refrain from configuring the memory system to use the one or more operating parameters based at least in part on determining the token value is different than the second value.

17. The non-transitory computer-readable medium of claim 13, wherein the instructions, when executed by the processor the electronic device, further cause the electronic device to:
    receive, from the host system, a first command signal having a quantity of bits and comprising the index value indicated in a portion of the first command signal.

18. The non-transitory computer-readable medium of claim 17, wherein the instructions, when executed by the processor the electronic device, further cause the electronic device to:
    receive, from the host system, a second command signal comprising the quantity of bits, wherein the portion of the second command signal comprises one or more reserved bits.

19. A method performed by a memory system, comprising:
    receiving, from a host system, an index value that is associated with an identification of the host system;
    identifying one or more operating parameters of the memory system based at least in part on the index value associated with the identification of the host system;
    configuring the memory system to use the one or more operating parameters based at least in part on identifying the one or more operating parameters;
    verifying, at the memory system, the index value with a value stored by the memory system that is associated with the one or more operating parameters, wherein configuring the memory system is based at least in part on verifying the index value with the value; and
    outputting, to the host system, an indication that the memory system is configured to use the one or more operating parameters associated with the index value based at least in part on configuring the memory system.

20. The method of claim 19, further comprising:
    receiving, from the host system, a token value that is associated with the index value; and
    determining that the token value matches a second value stored by the memory system and that is associated with the one or more operating parameters, wherein verifying the index value is based at least in part on determining that the token value matches the second value.

21. The method of claim 19, further comprising:
    outputting, to the host system, a memory system identifier; and
    receiving, from the host system, a token value that is generated based at least in part on the memory system identifier and a security key associated with the host system, wherein verifying the index value is based at least in part on receiving the token value.

22. The method of claim 21, further comprising:
    determining that the token value is different than a second value stored by the memory system and that is associated with the one or more operating parameters; and
    refraining from configuring the memory system to use the one or more operating parameters based at least in part on determining the token value is different than the second value.

23. The method of claim 21, further comprising:
    comparing the token value with a second value stored by the memory system and that is associated with the one or more operating parameters, wherein verifying the index value is based at least in part on comparing the token value with the second value.

24. The method of claim 19, further comprising:
    receiving, from the host system, a first command signal having a quantity of bits and comprising the index value indicated in a portion of the first command signal.

25. The method of claim 24, further comprising:
    receiving, from the host system, a second command signal comprising the quantity of bits, wherein the portion of the second command signal comprises one or more reserved bits.

* * * * *